Feb. 26, 1924.

O. E. BARTHEL

GREASE CUP

Filed Dec. 27, 1919

1,484,925

Inventor
Oliver E. Barthel,
By Barthel & Barthel
Attorneys

Patented Feb. 26, 1924.

1,484,925

UNITED STATES PATENT OFFICE.

OLIVER E. BARTHEL, OF DETROIT, MICHIGAN.

GREASE CUP.

Application filed December 27, 1919. Serial No. 347,745.

*To all whom it may concern:*

Be it known that I, OLIVER E. BARTHEL, a citizen of the United States of America, residing at Detroit, in the county of Wayne and State of Michigan, have invented certain new and useful Improvements in Grease Cups, of which the following is a specification, reference being had therein to the accompanying drawings.

This invention relates to grease cups, and has special reference to that class of lubricant containers constructed so that a lubricant may be forcibly and intermittently fed to a bearing, machine or structural part requiring lubrication.

The objects of my invention are, first, to furnish a force feed grease cup with a novel piston or grease propeller which is constructed to insure a non-leakable connection between the walls of the cup and the piston so that grease will be maintained on the proper side of the piston for ejecting purposes; second, to furnish a grease cup with a screw actuated piston having a feather edge susceptible to compression so that the edge of the piston will snugly engage walls of the cup; third, to provide such a cup with a piston stop to prevent feather edges of the piston from being injured by excessive adjustment of the piston; fourth, to embody simple and inexpensive means in a grease cup for preventing parts thereof from becoming accidentally displaced due to vibrations to which the cup may be subjected, especially when used as part of the lubricating system of a motor vehicle, and fifth, to provide a grease cup that is durable, easy to load, and which may have its contents ejected by hand or power otherwise applied.

The above are a few of the objects attained by my invention and reference will now be had to the drawing, wherein—

Figure 1:
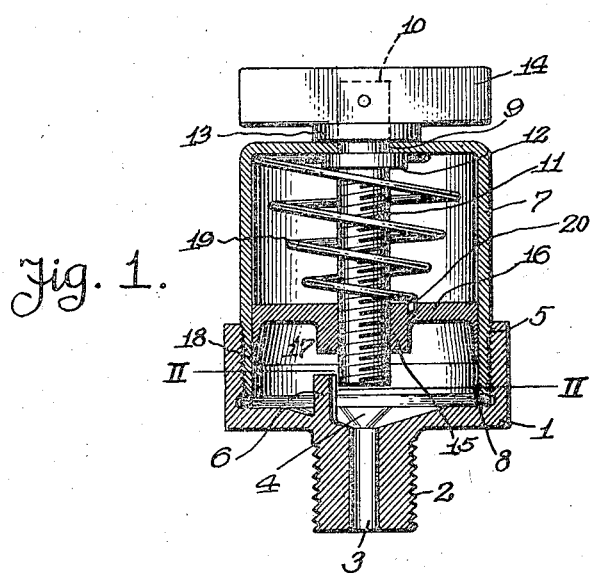
Figure 1 is a vertical sectional view of the grease cup.
Figure 2:
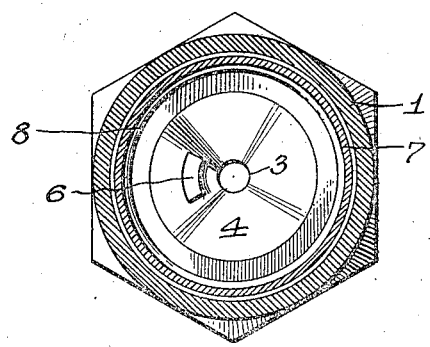
Fig. 2 is a horizontal sectional view of the same, taken on the line II—II of Fig. 1.

The lubricant container comprises a cup shaped base 1 having an axial depending nipple 2 which is exteriorly screw-threaded so that it may be mounted in a suitable support, said nipple having an axial bore 3 communicating with a basin 4 in the bottom of the base, and said basin forming a flared or funnel shaped entrance to the inner end of the bore 3 so that lubricant may readily enter the bore 3 and be ejected therefrom. The base 1 has its inner walls screwthreaded, as at 5, and projecting upwardly from the basin 4 is a segment shaped piston stop 6 which is preferably in the form of a lug formed integral with the base 1.

Screwed into the base 1 is an inverted cup shaped receptacle or container 7 which has its inner cylindrical wall smooth, similar to a cylinder and its outer wall knurled or suitably roughened so that the receptacle may be gripped by hand and screwed into the base 1. The inner open end of the receptacle 7 is adapted to impinge against a compressible washer or gasket 8 within the base 1 and this compressible washer is constructed so that when compressed it will produce a tension against the inner end of the receptacle 1 to cause the threads of said receptacle to bind against the screw threads 5 of the base 1, the gasket 8 serving as a locking member to prevent accidental displacement of the receptacle 7 relative to the base 1. The gasket also has the office of a packing ring and does not interfere with the ejection of the contents of the receptacle.

The upper closed end of the receptacle 7 has an axial opening 9 to receive the upper end 10 of a screw 11, said screw having an integral collar 12 bearing against the inner wall of the top of the receptacle 7, and mounted against the outer wall of the top of said receptacle is a loose washer or collar 13 which cooperates with a handle or cross head 14 in rotatably supporting the screw 11 in the receptacle. The handle or cross head 14 is suitably mounted on the outer end of the screw and with the collar 13 and the flange 12 engaging the inner and outer sides of the top wall of the receptacle the screw 11 is rotatably held and cannot become accidentally displaced.

In screwthreaded engagement with the screw 11 is the central portion 15 of a piston 16, said piston having a skirt 17 terminating in a feather edge 18. The skirt 17 and its feather edge 18 snugly engage the inner cylindrical wall of the receptacle 7 and the feather edge is susceptible to compression against the receptacle wall by a heavy lubricating grease placed within the receptacle. With the feather edge of the piston snugly engaging the receptacle wall, it is practically impossible for grease or other matter in the lower part of the receptacle, to pass between the piston and the receptacle wall and reach a point above the piston, and it is thought that sufficient friction exists between the receptacle wall and the piston skirt 17 to prevent the piston from rotating when the screw 11 is turned to feed the piston longitudinally of the receptacle. However, to guard against any possible turning of the piston 16, which would preclude a feeding movement of said piston by the screw 11, a spiral or coiled compression spring 19 is located in the upper portion of the receptacle 7, between the piston and the top wall of the receptacle. The spring 19 has its lower convolution anchored, as at 20, relative to the piston 16 and the upper end or convolution of the spring frictionally engages the top wall of the receptacle or may be anchored similar to the lower convolution of the spring. The spring will exert or produce a constant pressure on the top of the piston 16 causing its threads to have a feeding relation to the screw 11, the piston being frictionally held against rotation so that the threads of the screw will cause the piston to be reciprocated when said screw is rotated.

With the receptacle 7 removed from the base 1 the piston 16 can be retracted by rotating the handle 14 and then grease can be packed in the open end of the receptacle against the piston. By then replacing the receptacle 7 the grease is in position to be forcibly fed, by the piston 16 through the nipple 2, and by rotating the handle 14, from time to time, a desired quantity of grease can be ejected from the receptacle to lubricate a bearing or any part requiring lubrication.

As the piston 16 is shifted towards the base 1 the central portion 15 thereof eventually impinges against the stop 6 and this stop prevents the feather edges of the piston skirt 17 from contacting with the base 1 and possibly being injured thereby.

In using an all metallic piston within the grease cup, I have eliminated washers, packing rings, and similar members made of leather and material susceptible to deterioration by the contents of the grease cup, and the longevity of my piston obviates renewing any parts of the grease cup. It is practically impossible for grease to pass from one side of the piston to the other side and eventually render the cup inactive, therefore I attach considerable importance to the metallic piston with its feather edged skirt. The grease or oil can only be ejected through the base 1 and the greater the resistance encountered by the lubricant the greater the compression against the feather edges of the piston to form a seal when said piston is adjusted to eject the lubricant.

It is obvious that the grease cup can be made of a large size and the feeding operation intermittently performed by power, and while in the drawings, there is illustrated a preferred embodiment of my invention, I desire it to be understood that the structural elements are susceptible to such variations and modifications as fall within the scope of the appended claims.

What I claim is:—

A grease cup comprising a base adapted to have grease ejected therefrom, an inverted cup shaped receptacle having its open end detachably connected to said base, a rotatable screw axially of said receptacle supported by the closed end of said receptacle, a one piece metallic piston adapted to be reciprocated in said receptacle by said screw, means at one side of said piston to prevent rotation thereof relative to said screw, and means carried by said base adapted to be engaged by the central portion of said piston to prevent said piston from contacting with said base.

In testimony whereof I affix my signature in the presence of two witnesses.

OLIVER E. BARTHEL.

Witnesses:—
KARL H. BUTLER,
G. E. MCGRANN.